US012391062B2

(12) United States Patent
Sandon

(10) Patent No.: US 12,391,062 B2
(45) Date of Patent: Aug. 19, 2025

(54) CLEANING AND DRYING APPARATUS FOR A PAINT ROLLER

(71) Applicant: Jesse Sandon, Peoria, AZ (US)

(72) Inventor: Robert Sandon, Peoria, AZ (US)

( * ) Notice: Subject to any disclaimer, the term of this patent is extended or adjusted under 35 U.S.C. 154(b) by 193 days.

(21) Appl. No.: 18/214,164

(22) Filed: Jun. 26, 2023

(65) Prior Publication Data

US 2024/0424827 A1 Dec. 26, 2024

(51) Int. Cl.
*B44D 3/00* (2006.01)

(52) U.S. Cl.
CPC .................................... *B44D 3/006* (2013.01)

(58) Field of Classification Search
None
See application file for complete search history.

(56) References Cited

U.S. PATENT DOCUMENTS

| | | | | |
|---|---|---|---|---|
| 4,765,353 A | 8/1988 | Rhoades | | |
| 5,033,491 A | 7/1991 | Middleton | | |
| D342,356 S | 12/1993 | Gratopp | | |
| 5,614,021 A * | 3/1997 | Catlin | B44D 3/006 | 134/900 |
| 5,626,158 A * | 5/1997 | Gratopp | B44D 3/006 | 134/900 |
| 6,116,255 A | 9/2000 | Walter | | |
| 6,408,862 B1 | 6/2002 | van Rooyen | | |
| 7,435,030 B2 | 10/2008 | Atterbury | | |
| 8,505,562 B2 | 8/2013 | McPhee, III | | |
| 8,973,592 B2 | 3/2015 | Suydam | | |
| 9,834,033 B2 * | 12/2017 | Egan | B44D 3/006 | |
| 2008/0035185 A1 | 2/2008 | Baratta | | |
| 2008/0078429 A1 * | 4/2008 | Hoffmann | B44D 3/006 | 134/178 |

FOREIGN PATENT DOCUMENTS

| | | |
|---|---|---|
| WO | WO2006107743 | 10/2006 |

* cited by examiner

*Primary Examiner* — Rita P Adhlakha

(57) ABSTRACT

A cleaning apparatus for both cleaning and drying a paint roller with streams of water directed at the paint roller includes a main tube and a spray head attached to one end of the main tube. The paint roller is attachable to the main tube via a roller holder which is slidable along the main tube. The paint roller is positionable so that the spray head directs fluid toward a roller cover of the paint roller. A secondary tube is in fluid communication with the main tube and is oriented to direct fluid against the roller cover such that the roller cover is urged to rotate by fluid flowing through the secondary tube.

11 Claims, 5 Drawing Sheets

CLEANING AND DRYING APPARATUS FOR A PAINT ROLLER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to paint roller cleaning apparatuses and more particularly pertains to a new paint roller cleaning apparatus for both cleaning and drying a paint roller with streams of water directed at the paint roller.

(2) Description of Related Art Including Information Disclosed Under 37 CFR 1.97 and 1.98

The prior art describes myriad apparatuses which clean a roller cover of a paint roller by directing streams of water or other cleaning fluid at the roller cover. However, the prior art does not describe such a device which also at least partially dries the roller cover using a stream of water. A stream of water may be used to partially dry the roller by configuring the stream of water to have a width significantly smaller than the roller cover and to cause the stream to have enough inertia to cause the roller cover to spin such that water collected on the roller cover is projected off of the roller cover via a centrifugal force.

The portion of the roller cover which is impacted by the stream of water will be particularly likely to remain wet. But a majority of the roller cover may be partially dried by such an apparatus. Such an apparatus would be advantageous in that a user would be able to at least partially dry the roller cover by turning a valve immediately after washing the roller cover with the same device. The device may also limit interacting directly with the roller cover when the roller cover is soaking wet, which can transfer water uncomfortably onto the user.

BRIEF SUMMARY OF THE INVENTION

An embodiment of the disclosure meets the needs presented above by generally comprising a main tube is elongated between a first end and a second end of the main tube. The main tube has a first side and a second side each extending between the first end and the second end. A spray head is coupled to the first end of the main tube and is in fluid communication with the main tube. The spray head has a plurality of nozzles extending therein. Each nozzle of the plurality of nozzles faces away from the first side of the main tube and is configured to direct a fluid out of the spray head away from the main tube. A roller holder is coupled to the main tube and is configured for holding a paint roller such that a roller cover of the paint roller is positioned in a flow path of the fluid extending away from the plurality of nozzles. The roller holder is movable longitudinally with respect to the main tube to position the paint roller in a desired position.

A secondary tube is in fluid communication with the main tube. An outlet portion of the secondary tube is positioned such that the secondary tube is configured to direct the fluid from the main tube against the roller cover to urge the roller cover to rotate with respect to the roller frame of the paint roller. A sprayer valve is coupled to the main tube. The sprayer valve is moveable between an open position and a closed position, and the sprayer valve is configured to permit the fluid through the main tube toward the spray head only when open.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
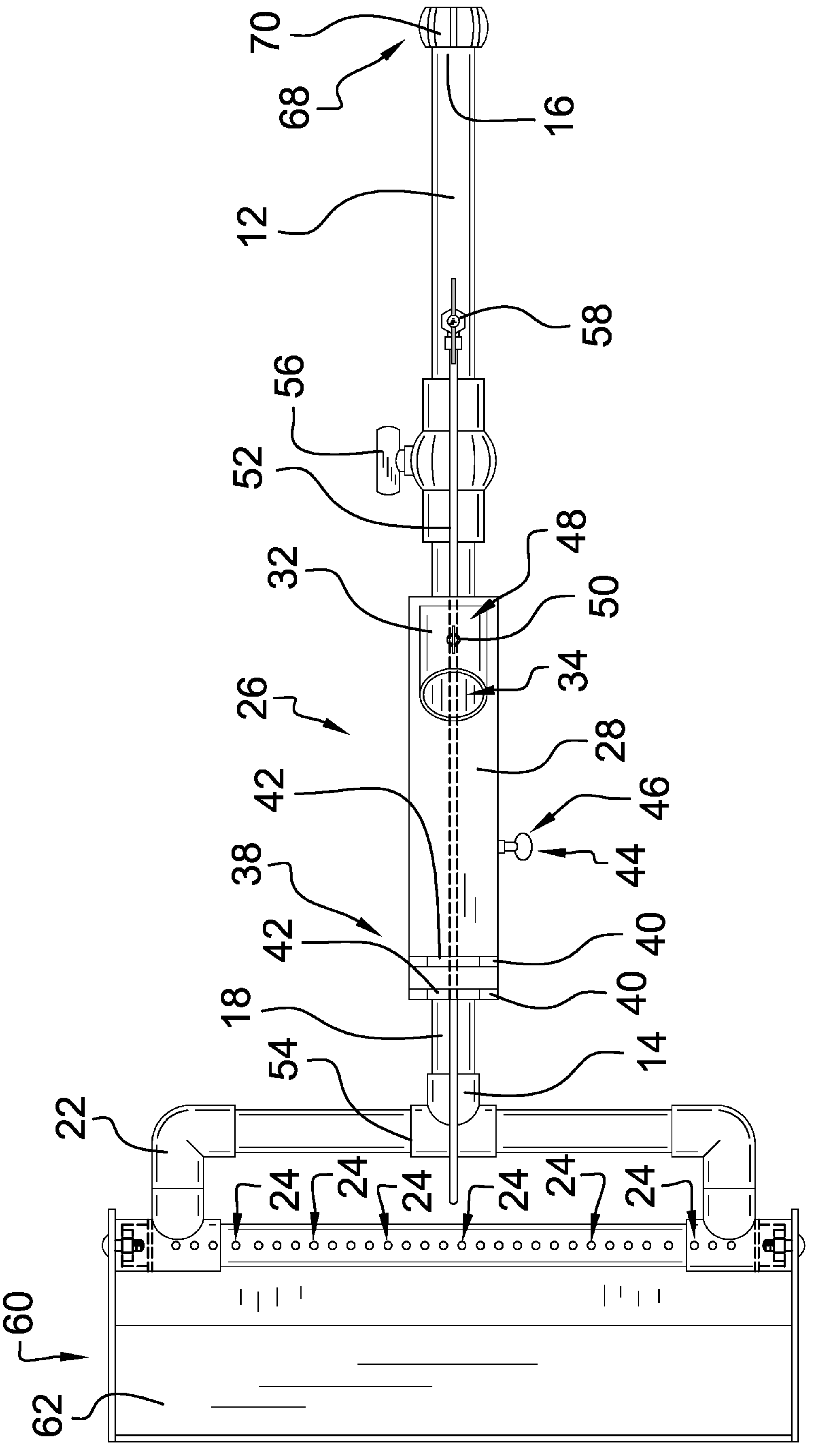
FIG. 1 is a top view of a cleaning apparatus according to an embodiment of the disclosure.
Figure 2:
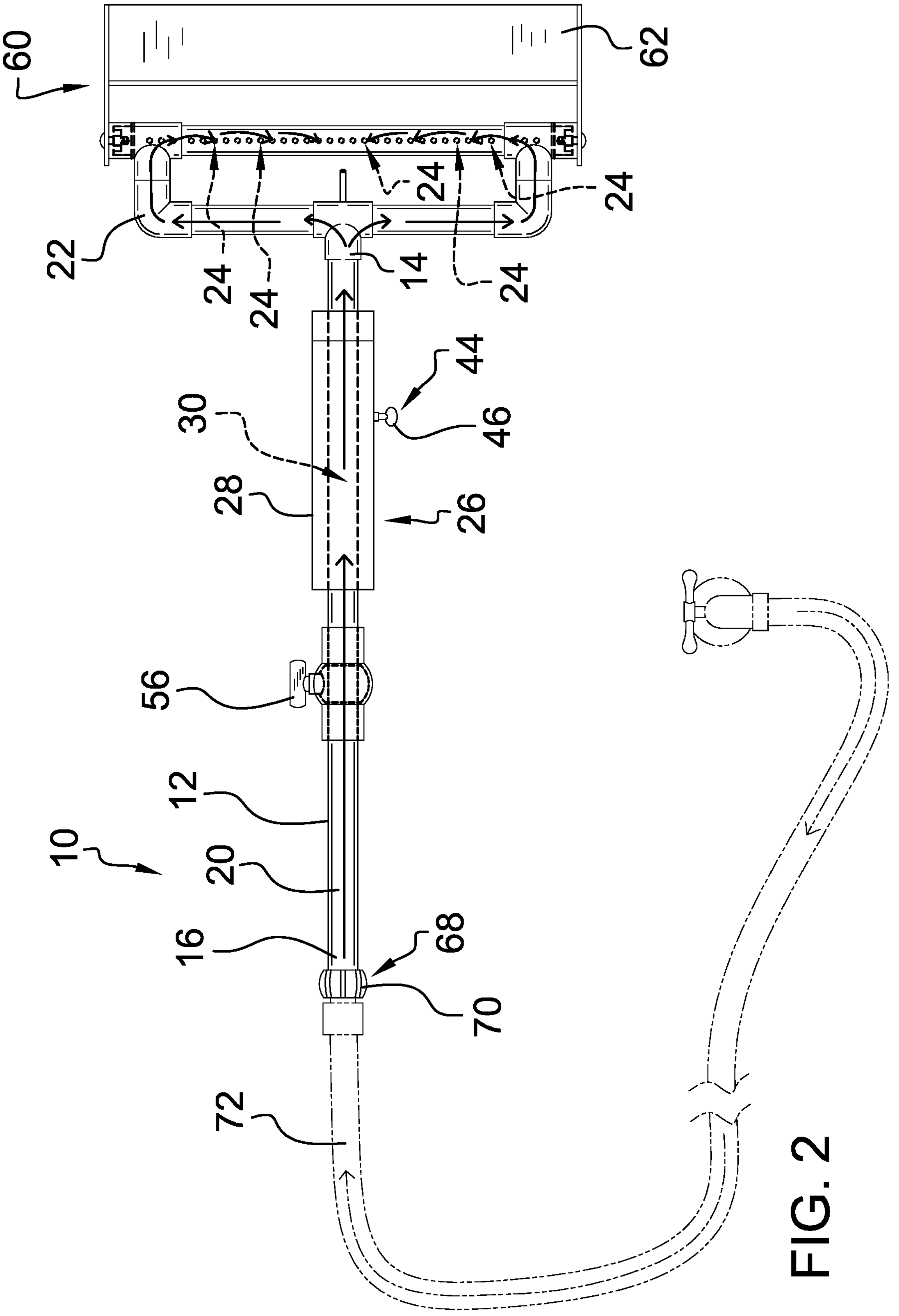
FIG. 2 is a bottom view of an embodiment of the disclosure.
Figure 4:
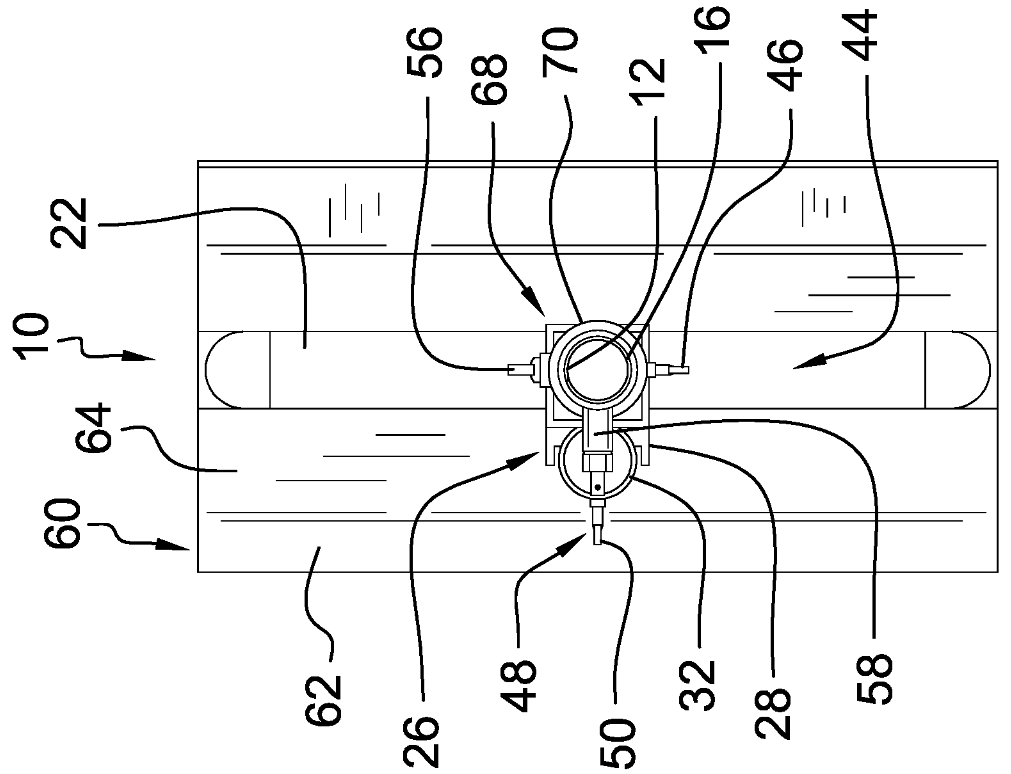
FIG. 4 is a rear view of an embodiment of the disclosure.
Figure 3:
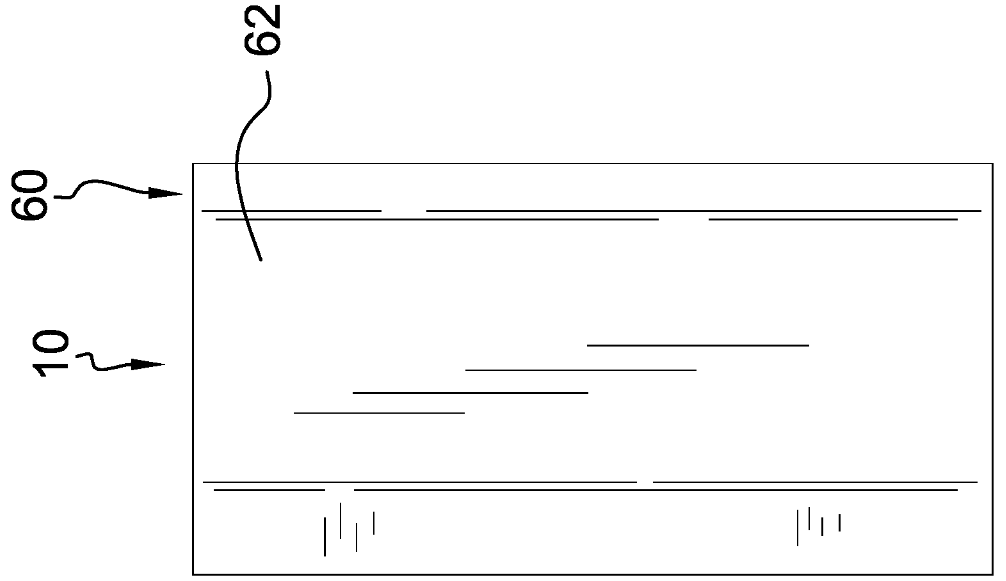
FIG. 3 is a front view of an embodiment of the disclosure.
Figure 5:
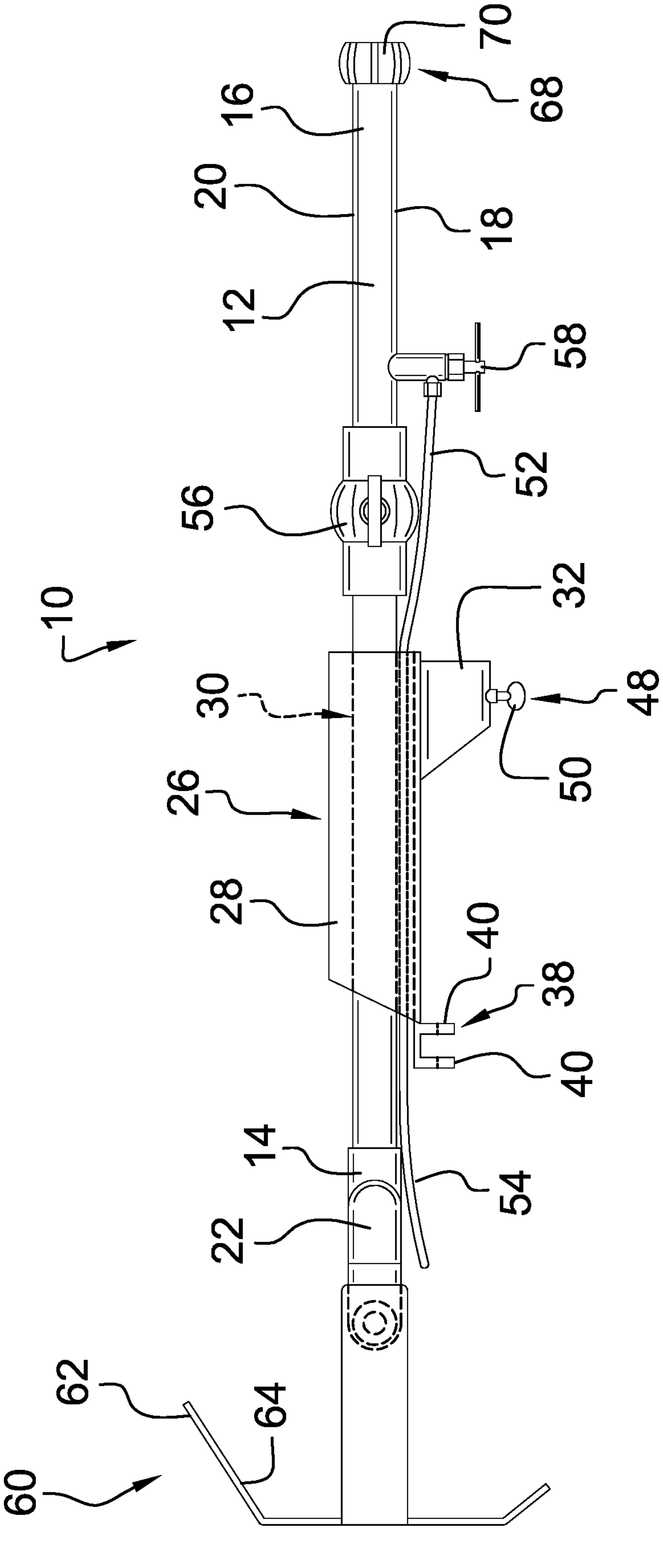
FIG. 5 is a first side view of an embodiment of the disclosure.
Figure 6:
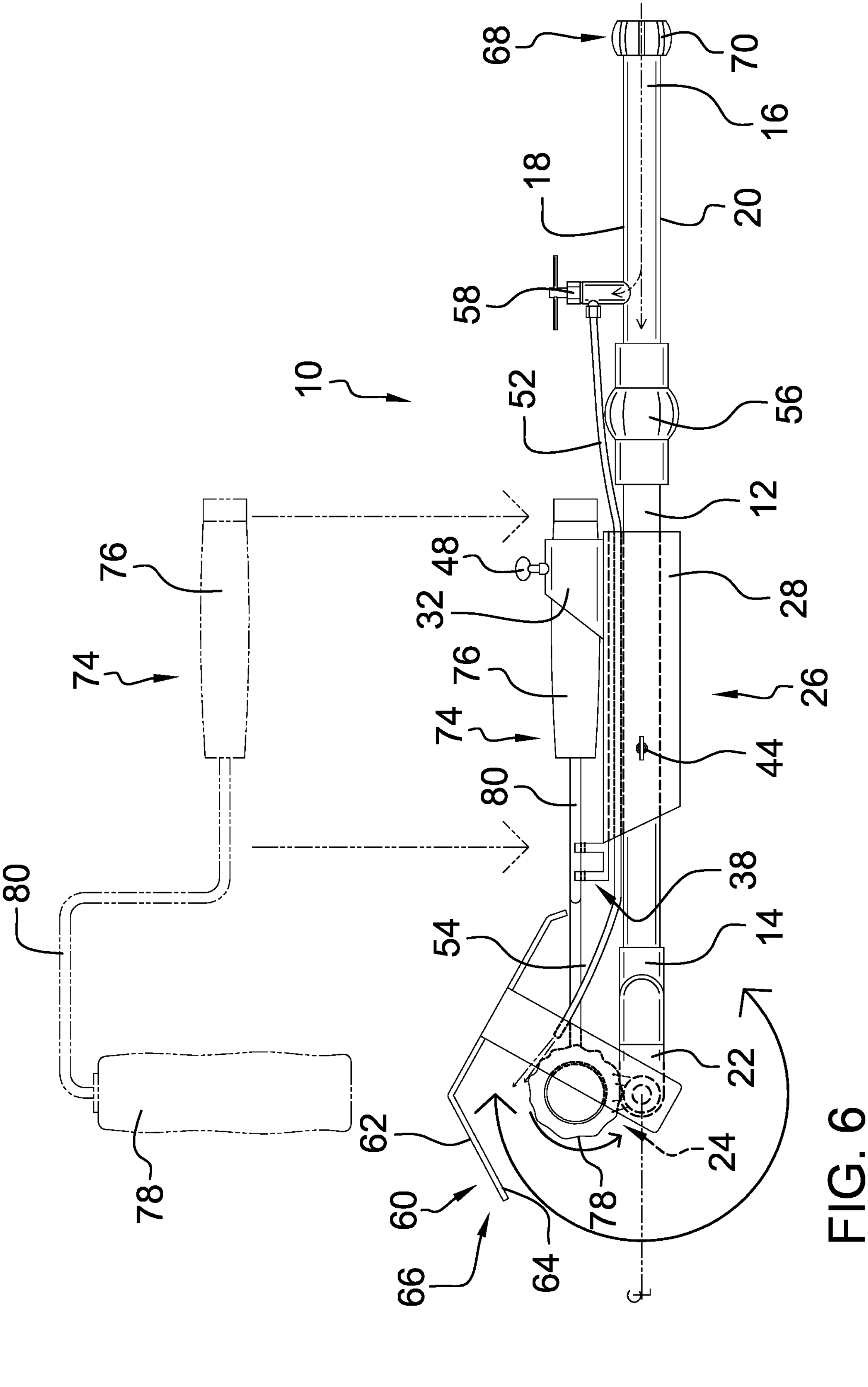
FIG. 6 is a second side in-use view of an embodiment of the disclosure.

With reference now to the drawings, and in particular to FIGS. 1 through 6 thereof, a new paint roller cleaning apparatus embodying the principles and concepts of an embodiment of the disclosure and generally designated by the reference numeral 10 will be described.

As best illustrated in FIGS. 1 through 6, the cleaning apparatus 10 generally comprises a main tube 12 which is elongated between a first end 14 and a second end 16 of the main tube 12 and has a first side 18 and a second side 20 which each extend between the first end 14 and the second end 16. A spray head 22 is coupled to the first end 14 of the main tube 12 and is in fluid communication with the main tube 12. The spray head 22 has a plurality of nozzles 24 extending therein. The plurality of nozzles 24 is arranged along a sprayer plane which is oriented perpendicularly to a longitudinal axis of the main tube 12. Each nozzle 24 of the plurality of nozzles 24 face away from the first side 18 of the main tube 12 and is configured to direct a fluid out of the spray head 22 away from the main tube 12. A roller holder 26 is coupled to the main tube 12 and is configured for holding a paint roller 74 such that a roller cover 78 of the paint roller 74 is positioned in a flow path of the fluid extending away from the plurality of nozzles 24. The roller holder 26 is movable longitudinally with respect to the main tube 12 to position the paint roller 74 in a desired position.

The roller holder 26 comprises a base 28 which is slidably coupled to the main tube 12 and a sleeve 32 which is coupled to the base 28. The sleeve 32 defines a channel 34 which extends parallel to the longitudinal axis of the main tube 12 and is configured to contain a handle 76 of the paint roller 74 and position the roller cover 78 of the paint roller 74 in the flow path of the fluid. The base 28 defines a conduit 30 that extends through the base 28 and receives the main tube 12. The roller holder 26 further comprises a brace 38 which is coupled to the base 28 and is spaced from the sleeve 32 in a direction toward the spray head 22. The brace 38 has a pair of engagement members 40 which each have a concavely arcuate surface 42 facing away from the first side 18 of the main tube 12. The concavely arcuate surface 42 of each engagement member 40 of the pair of engagement members 40 is configured to engage a frame of the paint roller 74 when the handle 76 is contained in the sleeve 32 to inhibit a movement of the paint roller 74 with respect to the main tube 12.

The roller holder 26 additionally comprises a holder retainer 44 and a roller retainer 48. The holder retainer 44 is coupled to the base 28 for retaining the roller holder 26 in a desired position along the main tube 12. The holder retainer 44 comprises a holder set screw 46 but may comprise a locking pin, another conventional clamping means, or the like. The roller retainer 48 is coupled to the sleeve 32 and is configured to secure the handle 76 of the paint roller 74 to the sleeve 32. The roller retainer 48 comprises a roller set screw 50 but may comprise a locking pin, another conventional clamping means, or the like.

A secondary tube 52 is in fluid communication with the main tube 12. An outlet portion 54 of the secondary tube 52 is positioned such that the secondary tube 52 is configured to direct the fluid from the main tube 12 against the roller cover 78 to urge the roller cover 78 to rotate with respect to the roller frame 80 of the paint roller 74. An inner dimension of the secondary tube 52 is sized such that a secondary flow of fluid extending from the outlet portion 54 of the secondary tube 52 to the roller cover 78 strikes less than 15.0 percent of a surface area of the roller cover 78. A sprayer valve 56 is coupled to the main tube 12. The sprayer valve 56 is moveable between an open position and a closed position and is configured to permit the fluid through the main tube 12 toward the spray head 22 only when open. A rotator valve 58 is coupled to the secondary tube 52. The rotator valve 58 is movable between an open position and a closed position and is configured to permit the fluid through the secondary tube 52 toward the outlet portion 54 of the secondary tube 52 only when open. The sprayer valve 56 is positioned between the rotator valve 58 and the spray head 22. In some embodiments, a single control valve is provided which directs the fluid alternately toward the spray head 22 or through the secondary tube 52. The single control valve may also be operable to prevent the fluid from flowing through the main tube 12 at all.

A spray shield 60 is coupled to the spray head 22. The spray shield 60 has a panel 62 which is positionable in a use position 66, wherein a shielding surface 64 of the panel 62 faces the plurality of nozzles 24 and the panel 62 is extends at least partially around the roller cover 78 when the roller cover 78 is positioned in the flow path of the fluid. The spray shield 60 is pivotally coupled to the spray head 22 such that the spray shield 60 is pivotable alternately toward and away from the first side 18 of the main tube 12. Moving the spray shield 60 away from the first side 18 of the main tube 12 provides space to install the paint roller 74 into the roller holder 26. A connector 68 is coupled to the second end 16 of the main tube 12. The connector 68 comprises a collar 70 with internal threads which are engageable with external threads of a hose 72 to couple the hose 72 to the main tube 12.

The cleaning apparatus 10 is configured for accommodating paint rollers 74 with various dimensions. For example, the roller retainer 48 is moveable with respect to the sleeve 32 of the roller holder 26 to interchangeably engage differently sized and shaped handles 76 of various paint rollers 74. The roller holder 26 is movable longitudinally with respect to the main tube 12 such that the roller cover 78 may be positioned as desired in the flow path of the fluid. And the spray shield 60 is pivotable to accommodate for differently sized and shaped roller frames 80 of the various paint rollers 74 while substantially shielding a surrounding environment from overspray from the spray head 22.

In use, the paint roller 74 is installed in the roller holder 26 and the roller cover 78 of the paint roller 74 is positioned in the flow path of the fluid. Fluid is directed through the main tube 12 and out of the plurality of nozzles 24 of the spray head 22 to clean paint or other materials off of the roller cover 78. The roller cover 78 may be positioned such that the flow of fluid from the spray head 22 also causes the roller cover 78 to rotate, which allows for all sides of the roller cover 78 to be cleaned. The rotator valve 58 may also be operated to direct some of the fluid through the secondary tube 52 to rotate the roller. The fluid may be water, a cleaning solution, or some other fluid which may urge the paint off of the roller cover 78.

To at least partially dry the roller cover 78, the sprayer valve 56 is closed and the rotator valve 58 is opened. The secondary flow of fluid then urges the roller cover 78 to rotate such that fluid adhered to the roller cover 78 is projected outwardly from the roller cover 78 via a centrifugal force. During this process, a portion of the roller cover 78 may accumulate more fluid via the secondary tube 52, but the overall effect of this drying process described is to remove more fluid from the roller cover 78 than is added thereto.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cleaning apparatus for a paint roller, the cleaning apparatus comprising:

- a main tube being elongated between a first end and a second end of the main tube, the main tube having a first side and a second side each extending between the first end and the second end;
- a spray head being coupled to the first end of the main tube, the spray head being in fluid communication with the main tube, the spray head having a plurality of nozzles extending therein, each nozzle of the plurality of nozzles facing away from the first side of the main tube, the plurality of nozzles being configured to direct a fluid out of the spray head away from the main tube;
- a roller holder being coupled to the main tube, the roller holder being configured for holding the paint roller such that a roller cover of the paint roller is positioned in a flow path of the fluid extending away from the plurality of nozzles, the roller holder being movable longitudinally with respect to the main tube to position the paint roller in a desired position;
- a secondary tube being in fluid communication with the main tube, an outlet portion of the secondary tube being positioned such that the secondary tube is configured to direct the fluid from the main tube against the roller cover to urge the roller cover to rotate with respect to the roller frame of the paint roller;
- a sprayer valve being coupled to the main tube, the sprayer valve being moveable between an open position and a closed position, the sprayer valve being configured to permit the fluid through the main tube toward the spray head only when open; and
- wherein the roller holder comprises
  - a base being coupled to the main tube, the base being slidably coupled to the main tube, and
  - a sleeve being coupled to and extending from an outer surface of the base. the sleeve defining a channel which extends parallel to the longitudinal axis of the main tube, the sleeve being configured to contain a handle of the paint roller and position the roller cover in the flow path of the fluid.

2. The apparatus of claim 1, wherein the plurality of nozzles is arranged along a sprayer plane which is oriented perpendicularly to a longitudinal axis of the main tube.

3. The apparatus of claim 1, wherein the base defines a conduit extending therethrough which receives the main tube.

4. The apparatus of claim 1, wherein the roller holder further comprises a brace being coupled to the base and being spaced from the sleeve in a direction toward the spray head, the brace having an engagement member having a concavely arcuate surface facing away from the first side of the main tube, the concavely arcuate surface being configured to engage a frame of the paint roller when the handle is contained in the sleeve to inhibit a movement of the paint roller with respect to the main tube.

5. The apparatus of claim 1, wherein the roller holder further comprises a holder retainer being coupled to the base for retaining the roller holder in a desired position along the main tube.

6. The apparatus of claim 1, wherein the roller holder further comprises a roller retainer being coupled to the sleeve, the roller retainer being configured to secure the handle of the paint roller to the sleeve.

7. The apparatus of claim 1, further comprising a rotator valve being coupled to the secondary tube, the rotator valve being movable between an open position and a closed position, the rotator valve being configured to permit the fluid through the secondary tube toward the outlet portion of the secondary tube only when open, the sprayer valve being positioned between the rotator valve and the spray head.

8. The apparatus of claim 1, further comprising a spray shield being coupled to the spray head, the spray shield having a panel which is positionable in a use position, the panel having a shielding surface facing the plurality of nozzles when the panel is positioned in the use position, the panel being configured to extend partially around the roller cover when the roller cover is positioned in the flow path of the fluid and the panel is positioned in the use position.

9. The apparatus of claim 8, wherein the spray shield is pivotally coupled to the spray head such that the spray shield is pivotable alternately toward and away from the first side of the main tube.

10. The apparatus of claim 1, further comprising a connector being coupled to the second end of the main tube, the connector comprising a collar with internal threads, the internal threads of the collar being configured for engaging external threads of a hose to couple the hose to the main tube.

11. A cleaning apparatus for a paint roller, the cleaning apparatus comprising:

- a main tube being elongated between a first end and a second end of the main tube, the main tube having a first side and a second side each extending between the first end and the second end;
- a spray head being coupled to the first end of the main tube, the spray head being in fluid communication with the main tube, the spray head having a plurality of nozzles extending therein, the plurality of nozzles being arranged along a sprayer plane which is oriented perpendicularly to a longitudinal axis of the main tube, each nozzle of the plurality of nozzles facing away from the first side of the main tube, the plurality of nozzles being configured to direct a fluid out of the spray head away from the main tube;
- a roller holder being coupled to the main tube, the roller holder comprising:
  - a base being coupled to the main tube, the base being slidably coupled to the main tube, the base defining a conduit extending therethrough which receives the main tube;
  - a sleeve being coupled to and extending from an outer surface of the base the base, the sleeve defining a channel which extends parallel to the longitudinal axis of the main tube, the sleeve being configured to contain a handle of the paint roller and position a roller cover of the paint roller in a flow path of the fluid extending away from the plurality of nozzles;
  - a brace being coupled to the base and being spaced from the sleeve in a direction toward the spray head, the brace having a pair of engagement members each having a concavely arcuate surface facing away from the first side of the main tube, the concavely arcuate surface of each engagement member of the pair of engagement members being configured to engage a frame of the paint roller when the handle is contained in the sleeve to inhibit a movement of the paint roller with respect to the main tube;

a holder retainer being coupled to the base for retaining the roller holder in a desired position along the main tube, the holder retainer comprising a holder set screw; and a roller retainer being coupled to the sleeve, the roller retainer being configured to secure the handle of the paint roller to the sleeve, the roller retainer comprising a roller set screw;

a secondary tube being in fluid communication with the main tube, an outlet portion of the secondary tube being positioned such that the secondary tube is configured to direct the fluid from the main tube against the roller cover to urge the roller cover to rotate with respect to the roller frame of the paint roller;

a sprayer valve being coupled to the main tube, the sprayer valve being moveable between an open position and a closed position, the sprayer valve being configured to permit the fluid through the main tube toward the spray head only when open;

a rotator valve being coupled to the secondary tube, the rotator valve being movable between an open position and a closed position, the rotator valve being configured to permit the fluid through the secondary tube toward the outlet portion of the secondary tube only when open, the sprayer valve being positioned between the rotator valve and the spray head;

a spray shield being coupled to the spray head, the spray shield having a panel which is positionable in a use position, the panel having a shielding surface facing the plurality of nozzles when the panel is positioned in the use position, the panel being configured to extend partially around the roller cover when the roller cover is positioned in the flow path of the fluid and the panel is positioned in the use position, the spray shield being pivotally coupled to the spray head such that the spray shield is pivotable alternately toward and away from the first side of the main tube; and a connector being coupled to the second end of the main tube, the connector comprising a collar with internal threads, the internal threads of the collar being configured for engaging external threads of a hose to couple the hose to the main tube.

* * * * *